United States Patent
Ross et al.

(10) Patent No.: US 8,806,507 B1
(45) Date of Patent: Aug. 12, 2014

(54) DYNAMIC PROVISIONING OF MESSAGE GROUPS

(71) Applicant: Red Hat, Inc., Raleigh, NC (US)

(72) Inventors: Theodore Langston Ross, Littleton, MA (US); Kenneth Anthony Giusti, Shrewsbury, MA (US)

(73) Assignee: Red Hat, Inc., Raleigh, NC (US)

( * ) Notice: Subject to any disclaimer, the term of this patent is extended or adjusted under 35 U.S.C. 154(b) by 11 days.

(21) Appl. No.: 13/756,054

(22) Filed: Jan. 31, 2013

(51) Int. Cl.
*G06F 13/00* (2006.01)

(52) U.S. Cl.
USPC .......................................... 719/313; 719/314

(58) Field of Classification Search
USPC ................................................. 719/313, 314
See application file for complete search history.

(56) References Cited

U.S. PATENT DOCUMENTS

| | | | | |
|---|---|---|---|---|
| 8,276,160 B2* | 9/2012 | Blue et al. | | 719/314 |
| 8,495,656 B2* | 7/2013 | Johnson et al. | | 719/314 |
| 2003/0182464 A1* | 9/2003 | Hamilton et al. | | 709/314 |
| 2008/0263564 A1* | 10/2008 | Gambino | | 719/314 |
| 2013/0018960 A1* | 1/2013 | Knysz et al. | | 709/204 |

OTHER PUBLICATIONS

Jboss Messaging User's Manual 2.0.0 beta1, Chapter 27—Message Grouping, Jan. 10, 2012.
Oracle Corporation, "Using Message Unit-of-Order", Jan. 28, 2012.

* cited by examiner

*Primary Examiner* — Andy Ho
(74) *Attorney, Agent, or Firm* — Lowenstein Sandler LLP

(57) ABSTRACT

The subject matter of this specification can be implemented in, among other things, a method that includes receiving, by a processing device, one or more first requests to add multiple messages on a message queue. The first requests specify a message group for the messages. The method further includes determining, by the processing device, that the message group does not exist on the message queue in response to receiving the first requests. The method further includes automatically creating, by the processing device, the message group on the message queue in response to determining that the message group does not exist on the message queue. The method further includes adding, by the processing device, the messages to the message group on the message queue.

20 Claims, 3 Drawing Sheets

DYNAMIC PROVISIONING OF MESSAGE GROUPS

TECHNICAL FIELD

This specification relates to dynamically provisioning groups of messages in a message queue.

BACKGROUND

In computing systems, message queues are often used for inter-process communication, for inter-thread communication within the same process, and for communication between processes at separate computing systems. A message queue is a way to pass control or content from one process or thread to another. Generally, a sender that places a message on a message queue does not need to interact with the message queue at the same time as a receiver that takes the message off of the message queue. Messages placed onto the queue are stored until the recipient retrieves them.

In a typical message queue system, a system administrator installs and configures message queue management software, such as a message queue broker. The system administrator uses the message queue broker to define a message queue, which may include defining a name for the message queue. Receiver applications may then register software routines that listen for messages placed onto the message queue. Sender applications may connect to the message queue and transfer messages onto it. The message queue broker stores the messages until receiver applications connect and then call registered software routines to retrieve messages from the message queue. The receiver applications then process the retrieved messages.

DETAILED DESCRIPTION

This document describes messaging systems and messaging techniques for dynamically provisioning groups of messages in a message queue. The systems and techniques automatically create and/or remove message groups on a message queue as messages are added to and/or removed from the message queue, respectively. In some implementations, a message producer may add messages to a particular message group on a message queue using an identifier of the message group and a message consumer may remove messages from the message group without specifying the identifier of the message group. This may provide the advantage of allowing a message consumer to interoperate with the messaging system even though the message consumer may not have access to or knowledge of identifiers for the message groups. In addition, a message broker and/or message exchanges may participate in the messaging system without pre-existing (e.g., before a message being added to a message group is received) access to or knowledge of message group identifiers to be used by message producers in the messaging system. Furthermore, a message exchange that assigns messages from the message group to the message consumer may provide the advantage of ensuring consistency of message processing within the message group (e.g., ensuring that messages are processed in a particular order) without requiring configuration of the message group at the message exchange and/or the message queue.

Figure 1:
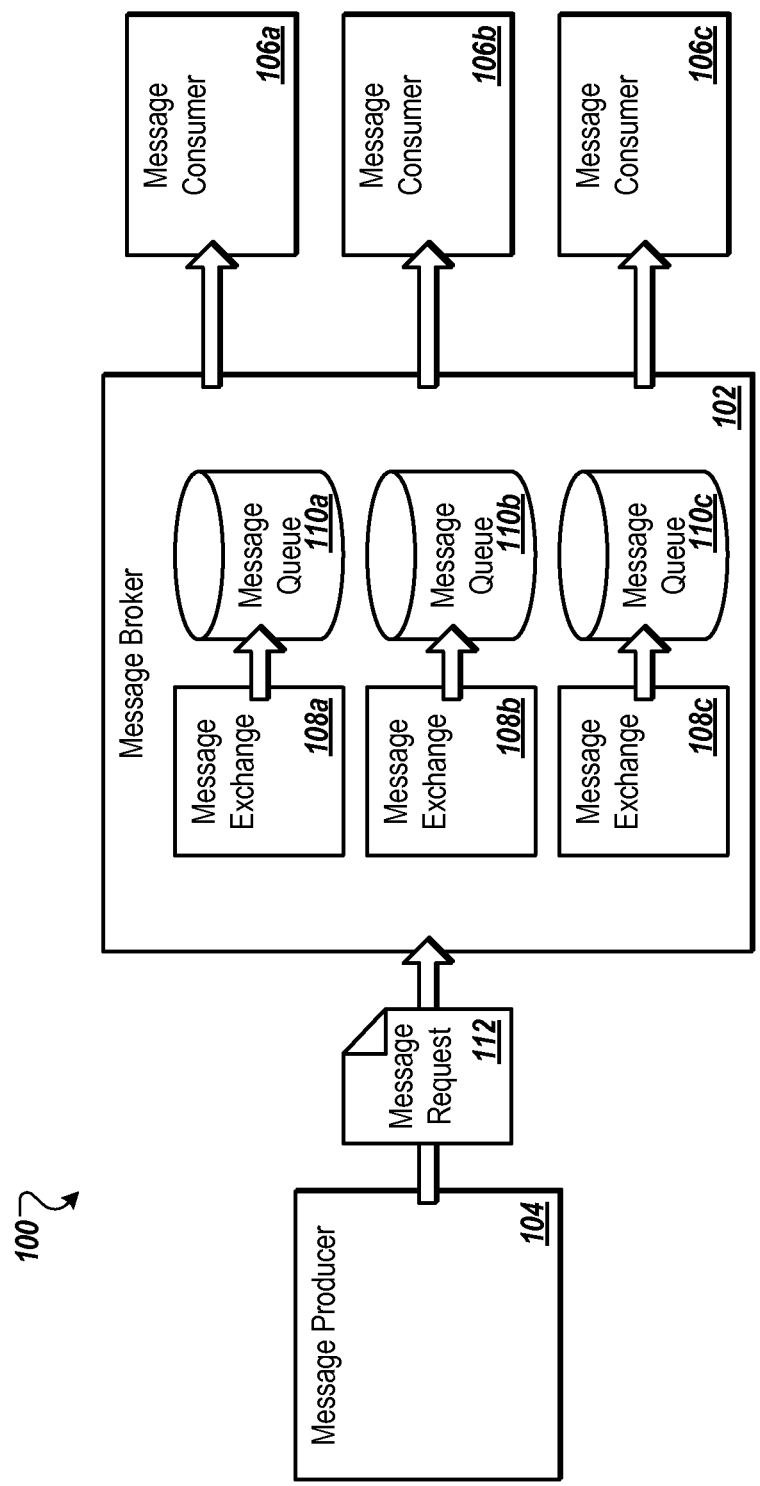
FIG. 1 is a schematic diagram that shows an example of a system for dynamically provisioning groups of messages in a message queue.

FIG. 1 is a schematic diagram that shows an example of a system 100 for dynamically provisioning groups of messages in a message queue. The system 100 includes a message broker 102 in communication with at least one message producer 104 and one or more message consumers 106a-c. The message broker 102, the message producer 104, and the message consumers 106a-c are applications that are each in operation at a computing device. The message broker 102, the message producer 104, and the message consumers 106a-c may be in operation at the same computing device. Alternatively, one or more of the message broker 102, the message producer 104, and the message consumers 106a-c may be in operation at separate computing devices. In the case of separate computing devices, one or more of the message broker 102, the message producer 104, and the message consumers 106a-c may be in communication over a network, such as a local network or the Internet. In some implementations, one or more of the message broker 102, the message producer 104, and the message consumers 106a-c may be in operation within a virtual machine at a computing device.

The message broker 102 manages one or more message exchanges 108a-c. The messages exchanges 108a-c can be part of the message broker 102 or components separate from the message broker 102. The message broker 102 and the message exchanges 108a-c may represent a messaging system that implements various aspects of the present disclosure. The message exchanges 108a-c add messages to and remove messages from one or more message queues 110a-c. For example, the message producer 104 may send a request 112 to the message broker 102 to add one or more messages to a message queue. The request 112 includes an identifier of a message exchange, such as the first message exchange 108a, to process the request 112. The identifier of the message exchange may be, for example, a name or network address of the message exchange that is configured at the message producer 104 as the destination for the message.

The request 112 also includes the contents of the messages and an identifier of a group for the messages. The message producer 104 may group the messages for a particular reason. For example, the messages may be a series of operations to be performed for an ecommerce shopping cart on a web page. Grouping the messages may ensure that the messages are processed together, such as by processing the messages in a particular order. The message producer 104 may specify the identifier for the message group, such as an identifier used for the shopping cart. The identifier may be unique to the particular message group at least within the message queue to which the messages are added. The message broker 102 receives the request 112 and determines that the request 112 is directed to the identifier of the first message exchange 108a. In response to the determination, the message broker 102 provides the request 112 to the first message exchange 108a.

In some implementations, the message broker 102 uses a standard message queuing protocol, such as the Advanced Message Queuing Protocol, to communicate the messages between the message producer 104 and the message consumers 106a-c. In addition, the message producer 104 and the message broker 102 may use an existing portion of a message header in the protocol to store the message group identifier for the messages. For example, the location for storing the message group identifier within the header of the request 112 may be preconfigured at the message broker 102 and/or the message producer 104 prior to the message producer 104 sending the request 112 to the message broker 102. In some implementations, the message consumers 106a-c may receive and process messages from the message queues 110a-c without knowledge of or access to the message group identifier or the portion of the message header that stores the message group identifier.

Each of the message exchanges 108a-c at the message broker 102 is bound to one or more of the message queues 110a-c. For example, during creation of the first message queue 110a, the message producer 104 may specify that the first message exchange 108a is bound to the first message queue 110a. Alternatively, one of the message consumers 106a-c may specify that the first message exchange 108a is bound to the first message queue 110a.

Accordingly, upon receiving the request 112, the first message exchange 108a determines that the request 112 includes the message group identifier. Alternatively, the message broker 102 may determine that the request 112 includes the message group identifier and provide the message group identifier to the first message exchange 108a. In response, the first message exchange 108a determines if a message group for the message group identifier already exists in the first message queue 110a. If the message group does not yet exist, then the first message exchange 108a automatically creates (e.g., without user interaction or involvement) the message group in the first message queue 110a and adds the messages from the request 112 to the created message group. If the message group already exists, then the first message exchange 108a adds the messages from the request 112 to the existing message group that has the same message group identifier as the request 112.

The message producer 104, or another message producer, may send further requests to the message broker 102, directed to the first message exchange 108a, that add messages to the message group in the first message queue 110a. The additional messages may include the same message group identifier as in the request 112, another message group identifier, or no message group identifier. The message broker 102 and the first message exchange 108a may process the further requests as described above with respect to the request 112 (e.g., a new message group identifier may result in a new message group being created).

One or more of the message consumers 106a-c listen to the first message queue 110a for messages. For example, the first message consumer 106a may check the first message queue 110a after the messages from the request 112 are added to the first message queue 110a. The message broker 102 and/or the message exchange 108a remove one or more of the messages from the first message queue 110a and provide the messages to the first message consumer 106a. In some implementations, the number of messages in a batch provided to a message consumer by the message broker 102 and/or the message exchanges 108a-c may be configured at the message broker 102. For example, the number of messages in a batch may be configured on a per message queue basis. The batch of messages provided to the first message consumer 106a may belong to the message group from the request 112.

The message broker 102 and/or the message exchange 108a may ensure that the messages from the group are processed in a particular order, such as the order in which the messages were added to the first message queue 110a or an order specified for the messages in the request 112. For example, the other message consumers 106b-c may check the first message queue 110a for messages after the first message consumer 106a receives the messages from the group. The message broker 102 and/or the message exchange 108a may wait to provide messages from the same group as was provided to the first message consumer 106a until the message broker 102 and/or the message exchange 108a receive acknowledgment from the first message consumer 106a that the first message consumer 106a has completed processing the messages provided. For example, the message broker 102 and/or the message exchange 108a may indicate to the other message consumers 106b-c that no messages from the group are ready to be processed even though there are messages for the group on the first message queue 110a. However, the message broker 102 and/or the message exchange 108a may provide messages from the first message queue 110a that belong to another message group that has received acknowledgment for any previously provided messages or messages that do not belong to a message group.

Once the message broker 102 and/or the message exchange 108a receive acknowledgment from the first message consumer 106a that the messages have been processed, then the message broker 102 and/or the message exchange 108a may provide additional messages from the group to the message consumers 106a-c. If the message broker 102 and/or the message exchange 108a provide the last message from the group to a message consumer, then the message broker 102 and/or the message exchange 108a automatically remove the message group from the first message queue 110a. In some implementations, the message broker 102 and/or the message exchange 108a wait until acknowledgment is received from the message consumer that the last message was processed before removing the message group. If the message broker 102 and/or the message exchange 108a do not receive an acknowledgment in a predetermined amount of time or if the message broker 102 and/or the message exchange 108a receive a non-acknowledgment indicating that the last message could not be processed, then the message broker 102 and/or the message exchange 108a may assign the last message to another message consumer.

As previously described, the message broker 102 may be implemented as part of an ecommerce website that provides a virtual shopping cart on a web page. A user at a client computing device may make inputs using the web page that add and remove items to and from the virtual shopping cart. The code for the web page at the client computing device and any server-side code that communicates with the web page may represent the message producer 104. The message producer 104 may enqueue a message for each shopping cart operation on a queue, such as the first message queue 110a. The message producer 104 may group the messages for the operations together by assigning a particular group identifier to each of the messages, such as a shopping cart identifier from a web browser cookie. Grouping the operations together instructs the message broker 102 and/or the message exchange 108a to process the messages together, such as by ensuring that the messages are processed in order.

The shopping cart operations in the messages on the first message queue 110a may be processed by more than one of the message consumers 106a-c. The message broker 102 and/or the message exchange 108a ensure that the operations within the message group are processed in order so that the operation to add an item to the shopping cart will be followed by the operation to remove the item even if separate message consumers process the operations. While this example is described with respect to a combination of a client device and a server device over a network, the message producer 104, the message broker 102, and the message consumers 106a-c may all be implemented at a client device or a server device.

Figure 2:
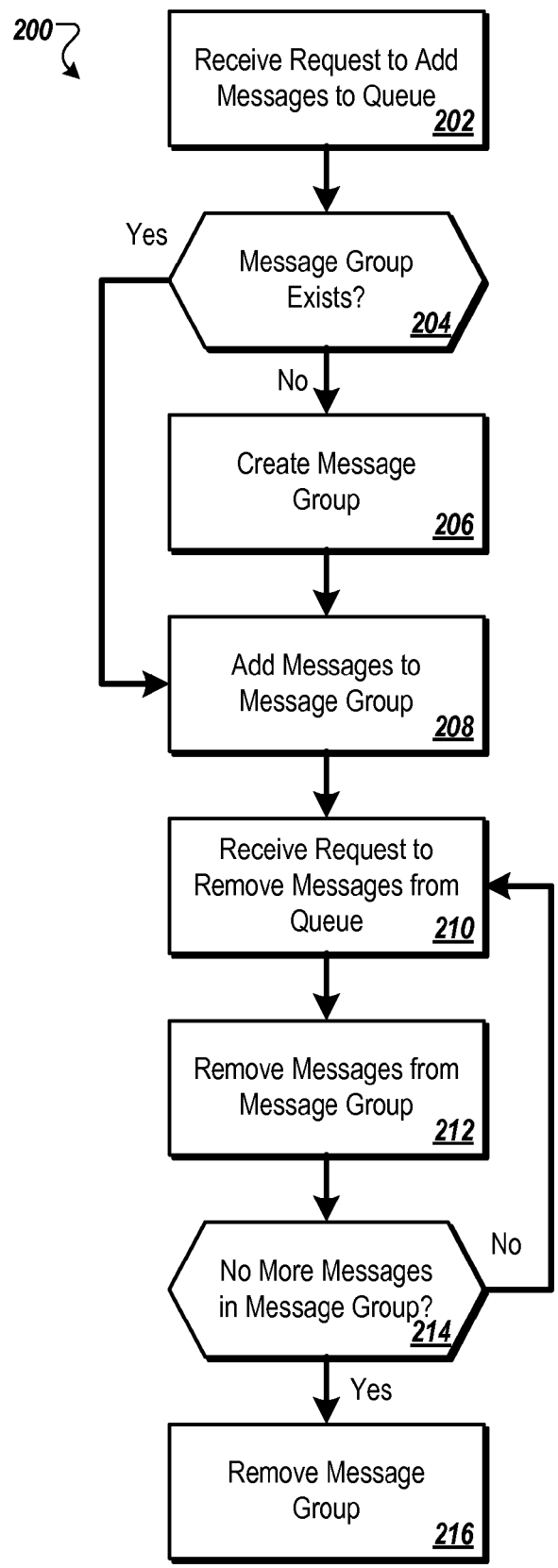
FIG. 2 is flow chart that shows an example of a process for dynamically provisioning groups of messages in a message queue.

FIG. 2 is a flow chart that shows an example of a process 200 for dynamically provisioning groups of messages in a message queue. The process 200 may be performed, for example, by a messaging system such as the system 100 including the message producer 104, the message broker 102, and the message exchanges 108a-c of FIG. 1. For clarity of presentation, the description that follows uses the messaging system as an example for describing the process 200. However, another system, or combination of systems, may be used to perform the process 200.

The process 200 begins, at step 202, with receiving one or more first requests to add multiple messages on a message queue. The first requests specify a message group for the messages. In some implementations, the message queue uses the Advanced Message Queuing Protocol. In some implementations, the first requests specify the message group by providing a message group identifier for the message group in an existing field of the first requests. For example, the message producer 104 may send the request 112 to the message exchange 108a to add messages to a particular message group on the first message queue 110a. The message producer 104 may specify the message group identifier for the message group in a header field of the protocol used to communicate with the first message exchange 108a, such as the Advanced Message Queuing Protocol.

In some implementations, the process 200 includes receiving a request to enable automatic creation or removal of message groups. The process 200 then automatically creates or removes message groups in response to receiving the request. For example, the message broker 102 and/or the first message exchange 108a may receive a request from the message producer 104 or another application that enables automatic creation or removal of message groups (e.g., for a particular message exchange or a particular message queue), such as by specifying a field within the header of the message protocol in which the message group identifier is stored.

At step 204, in response to receiving the first requests, the process 200 includes determining whether the message group already exists on the message queue. For example, the message broker 102 and/or the first message exchange 108a may extract the message group identifier from the header field of the request 112. The message broker 102 and/or the first message exchange 108a may compare the extracted message group identifier to message group identifier information for the first message queue 110a to determine if the message group for the extracted message group identifier already exists in the first message queue 110a. For example, the message broker 102 and/or the first message exchange 108a may compare the extracted message group identifier to the message group identifiers of each message in the first message queue 110a or to a list of message group identifiers from the first message queue 110a.

At step 206, in response to determining that the message group does not already exist on the message queue, the process 200 includes automatically creating the message group on the message queue. Otherwise, if the message group already exists, then the process 200 proceeds to step 208. For example, if the message broker 102 and/or the first message exchange 108a determine that the message group for the request 112 does not already exist for the first message queue 110a, then the message broker 102 and/or the first message exchange 108a create the message group. Creating the message group may include, for example, creating memory structures used for handling requests from message producers to enqueue messages and from message consumers to dequeue messages for the message group. The message broker 102 and/or the first message exchange 108a may store information in the memory structures that is used to ensure that the messages from the message group are processed in order.

At step 208, the process 200 includes adding the messages to the message group on the message queue. For example, the message broker 102 and/or the first message exchange 108a may add the messages from the request 112 to the specified message group on the first message queue 110a, such as by storing the message group identifier with the message on the message queue or by storing the message in a portion of the message queue designated for the specified message group.

At step 210, the process 200 includes receiving one or more second requests to remove the messages from the message queue. In some implementations, the second requests do not specify the message group. For example, the message broker 102 and/or the first message exchange 108a may receive a request from the message consumer 106a to dequeue messages from the first message queue 110a.

At step 212, the process 200 includes removing the messages from the message group on the message queue. For example, the message broker 102 and/or the first message exchange 108a may remove messages from the first message queue 110a that belong to the message group and provide the messages to the first message consumer 106a in response to a request for messages from the first message consumer 106a. The process 200 may include removing the messages in order within the message group and/or ensuring that the removed messages are processed in order.

At step 214, the process 200 includes determining whether the message group still has any messages. For example, upon dequeuing messages that belong to a message group, the message broker 102 and/or the first message exchange 108a may compare the message group identifier of the dequeued messages to the message group identifiers of the messages that remain in the first message queue 110a to determine if any of the messages that remain have the same message group identifier as the dequeued messages. Alternatively, the message broker 102 and/or the first message exchange 108a may keep a count or other accounting of the number of messages on the first message queue 110a for each message group. The message broker 102 and/or the first message exchange 108a may then increment the count for a group as messages are added to the group and decrement the count as messages are removed from the group.

At step 216, the process 200 includes automatically removing the message group from the message queue in response to determining that the message group no longer has any messages. Otherwise, if the message group still has messages, then the process 200 may return to a previous step, such as step 210. For example, the message broker 102 and/or the first message exchange 108a may determine that no more messages exist for a particular message group. The message broker 102 and/or the first message exchange 108a may then remove or free up the memory structures that were created to process message requests for the message group.

Figure 3:
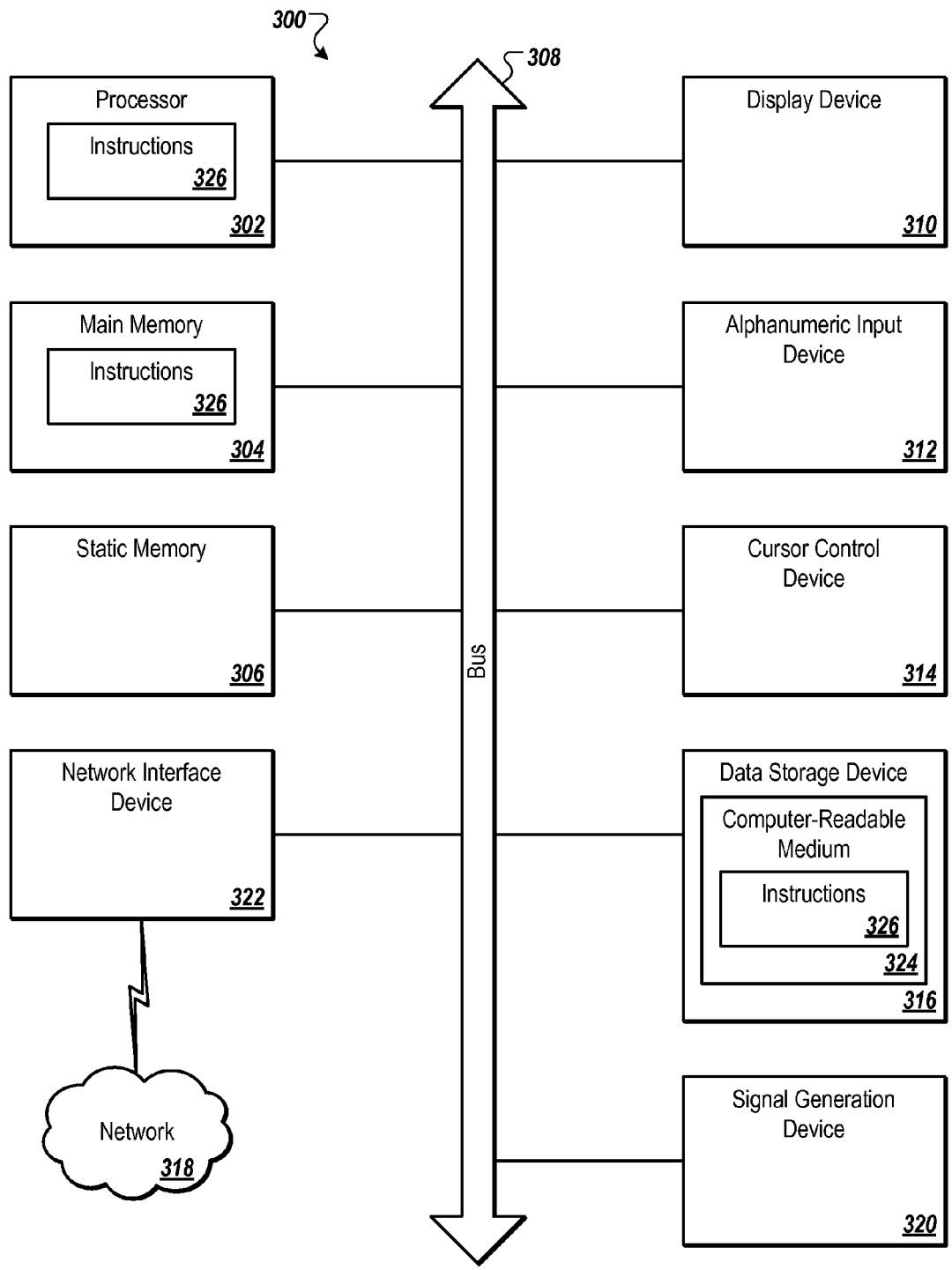
FIG. 3 is a schematic diagram that shows an example of a computing system.

FIG. 3 is a schematic diagram that shows an example of a machine in the form of a computer system 300. The computer system 300 executes one or more sets of instructions 326 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine.

Further, while only a single machine is illustrated, the term "machine" shall also be taken to include any collection of machines that individually or jointly execute the sets of instructions 326 to perform any one or more of the methodologies discussed herein.

The computer system 300 includes a processor 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 316, which communicate with each other via a bus 308.

The processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions of the message producer 104, the message broker 102, and/or the message consumers 106a-c for performing the operations and steps discussed herein.

The computer system 300 may further include a network interface device 322 that provides communication with other machines over a network 318, such as a local area network (LAN), an intranet, an extranet, or the Internet. The computer system 300 also may include a display device 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable storage medium 324 on which is stored the sets of instructions 326 of the message producer 104, the message broker 102, and/or the message consumers 106a-c embodying any one or more of the methodologies or functions described herein. The sets of instructions 326 of the message producer 104, the message broker 102, and/or the message consumers 106a-c may also reside, completely or at least partially, within the main memory 304 and/or within the processor 302 during execution thereof by the computer system 300, the main memory 304 and the processor 302 also constituting computer-readable storage media. The sets of instructions 326 may further be transmitted or received over the network 318 via the network interface device 322.

While the example of the computer-readable storage medium 324 is shown as a single medium, the term "computer-readable storage medium" can include a single medium or multiple media (e.g., a centralized or distributed database, and/or associated caches and servers) that store the sets of instructions 326. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying," "providing," "enabling," "finding," "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
  receiving, by a processing device, one or more first requests to add multiple messages on a message queue, wherein the first requests specify a message group for the messages;
  determining, by the processing device, that the message group does not exist on the message queue in response to receiving the first requests;
  automatically creating, by the processing device, the message group on the message queue in response to determining that the message group does not exist on the message queue; and
  adding, by the processing device, the messages to the message group on the message queue.

2. The method of claim 1, further comprising:
  receiving one or more second requests to remove the messages from the message queue;
  removing the messages from the message group on the message queue;
  determining that the message group no longer has any messages; and
  automatically removing the message group from the message queue in response to determining that the message group no longer has any messages.

3. The method of claim 2, wherein removing the messages comprises removing the messages in order within the message group.

4. The method of claim 3, further comprising:
  receiving a third request to enable automatic creation or removal of message groups; and
  wherein automatically creating or removing the message group is further in response to receiving the third request.

5. The method of claim 3, wherein the first requests specify the message group by providing a message group identifier for the message group in an existing field of the first requests.

6. The method of claim 5, wherein the second requests do not specify the message group.

7. The method of claim 6, wherein the message queue uses the Advanced Message Queuing Protocol.

8. A non-transitory computer-readable storage medium including instructions that, when executed by a processing device, cause the processing device to perform operations comprising:
  receiving, by the processing device, one or more first requests to add multiple messages on a message queue, wherein the first requests specify a message group for the messages;
  determining, by the processing device, that the message group does not exist on the message queue in response to receiving the first requests;
  automatically creating, by the processing device, the message group on the message queue in response to determining that the message group does not exist on the message queue; and
  adding, by the processing device, the messages to the message group on the message queue.

9. The computer-readable storage medium of claim 8, wherein the operations further comprise:
  receiving one or more second requests to remove the messages from the message queue;
  removing the messages from the message group on the message queue;
  determining that the message group no longer has any messages; and
  automatically removing the message group from the message queue in response to determining that the message group no longer has any messages.

10. The computer-readable storage medium of claim 9, wherein removing the messages comprises removing the messages in order within the message group.

11. The computer-readable storage medium of claim 10, wherein the operations further comprise:
  receiving a third request to enable automatic creation or removal of message groups; and
  wherein automatically creating or removing the message group is further in response to receiving the third request.

12. The computer-readable storage medium of claim 10, wherein the first requests specify the message group by providing a message group identifier for the message group in an existing field of the first requests.

13. The computer-readable storage medium of claim 12, wherein the second requests do not specify the message group.

14. The computer-readable storage medium of claim 13, wherein the message queue uses the Advanced Message Queuing Protocol.

15. A system comprising:
  an interface to receive one or more first requests to add multiple messages on a message queue, wherein the first requests specify a message group for the messages;
  a memory to store the message queue; and
  a processing device to determine that the message group does not exist on the message queue in response to receiving the first requests, automatically create the message group on the message queue in response to the determination that the message group does not exist on the message queue, and add the messages to the message group on the message queue.

16. The system of claim 15, wherein:
  the interface is further to receive one or more second requests to remove the messages from the message queue; and
  the processing device is further to remove the messages from the message group on the message queue, determine that the message group no longer has any messages, and automatically remove the message group from the message queue in response to the determination that the message group no longer has any messages.

17. The system of claim 16, wherein the processing device is to remove the messages in order within the message group.

18. The system of claim 17, wherein:
  the interface is further to receive a third request to enable automatic creation or removal of message groups; and
  the processing device is further to automatically create or remove the message group further in response to the receipt of the third request.

19. The system of claim 17, wherein the first requests specify the message group by providing a message group identifier for the message group in an existing field of the first requests.

20. The system of claim 19, wherein the second requests do not specify the message group.

\* \* \* \* \*